BINARY RADIX CONVERTER

Filed June 20, 1967 2 Sheets-Sheet 1

INVENTOR.
MICHAEL J. C. HU
BY
[signature]
ATTORNEY.

INVENTOR.
MICHAEL J. C. HU
BY
Roland G. Gustafson
ATTORNEY.

3,535,500
BINARY RADIX CONVERTER

Michael J. C. Hu, Palo Alto, Calif., assignor to the United States of America as represented by the United States Atomic Energy Commission Filed June 20, 1967, Ser. No. 648,189
Int. Cl. G06f 5/00
U.S. Cl. 235—155 3 Claims

ABSTRACT OF THE DISCLOSURE

A plurality of identical sublogic circuits connected in decade arrays to simultaneously and substantially instantaneously convert parallel binary representations to numerically equivalent parallel binary-coded decimal representations according to the modulo 1010 method.

BACKGROUND OF THE INVENTION

This invention relates to radix conversion, and more particularly, pertains to simultaneous conversion of representations of values in a binary numbering system having a base of 2 to equivalent parallel coded binary representations in a numbering system having a base greater than 2.

The invention disclosed herein was made under, or in, the course of Contract No. AT(04–3)–400 with the United States Atomic Energy Commission.

It is well known that a number in a first numbering system may be converted to an equivalent number in a second numbering system by dividing the first number by the base or modulus of the second numbering system with the modulus expressed in the first numbering system. In particular, structure has been provided in the prior art for converting representations of numbers coded in the straight binary code into binary-coded decimal form where a four-digit binary code weighted 8, 4, 2, 1 is used. Since a decimal 10 is equal to 1010 in binary-coded decimal form, the conversion may be termed the modulo 1010 method. The first step in a conversion of this type is carried out by dividing binary 1010 into the binary number to be converted following normal long division rules. The remainder of this first division constitutes the lowest order of the equivalent binary-coded decimal number. The second step of the conversion is to divide the quotient of the first division by 1010. The remainder of this second division constitutes the binary-coded decimal number in the next higher order. The next step of the conversion is to divide the quotient of the second division by 1010 to find the next higher order binary-coded decimal number. Successively higher order binary-coded decimal digits are obtained in a like manner until a quotient of less than 1010 is obtained. This quotient constitutes the highest order of the equivalent binary-coded decimal number.

Alternatively, conversion according to the modulo 1010 method may be accomplished by using binary 101 as a divisor instead of 1010. These operations are equivalent provided the lowest order dividend digit of each division by 101 is dropped from the dividend and used only as the lowest order remainder digit of that division. By using binary 101 as a divisor, structure for carrying out the conversion may be significantly simplified.

It is known to program various digital computers to carry out a conversion according to the modulo 1010 method. A computer, however, could not be used efficiently where only a simple conversion is needed and the capacity of the computer, as is generally the case, is otherwise required. Furthermore, it has been found that among other known methods for carrying out a simple binary to binary-coded decimal conversion, all variously require equipment that is either complex and expensive, operates slowly, needs accessories such as memory and timing circuits, or is high in cost. Examples of known arrangements for carrying out conversions according to the modulo 1010 method may be found in U.S. Patent Nos. 3,082,950 and 2,939,556.

SUMMARY OF THE INVENTION

It is an object of the invention to simultaneously and substantially instantaneously convert parallel binary representations of a number in a first numbering system having a base of 2 to an equivalent group of binary-coded parallel representations of an equivalent number in a second numbering system having a base greater than 2.

Another object is to convert a binary number to an equivalent binary-coded number using a plurality of arrays of identical sublogic elements which perform only gating functions.

Another object of the invention is to simultaneously and substantially instantaneously convert a binary number to an equivalent binary-coded decimal number by an arrangement operated according to the modulo 1010 method.

According to the present invention, identical sublogic elements may be arranged in logic arrays that have remainder outputs corresponding to successive ordinal positions in a binary-coded numbering system. The array corresponding to the lowest order of the binary-coded numbering system has a sufficient number of ordinal binary inputs to accommodate the representations of the largest binary number to be converted while successive higher ordinal arrays have a lesser number of inputs to accommodate the successively smaller quotient outputs from the adjacent lower ordinal arrays. The first quotient and remainder in a conversion may be obtained by testing a first group of binary representations which includes the highest orders, to determine whether these orders are greater than, equal to, or less than the modulus. If they are greater than or equal to the modulus, then a 1 representation is registered in the highest order of the quotient output and the difference is combined with the next lower order dividend digit for another test. However, if the first group of representations are less than the modulus, then a zero is registered in the highest order of the quotient and the second and third highest order digits are combined with the next lower order dividend digit for another test. This same plan is followed for successive lower order binary representations of the number to be converted until a remainder representation is indicated at the remainder output of the lowest binary-coded ordinal array. This remainder represents the lowest order number of the binary-coded equivalent. Division of the quotient representations at the quotient output of the lowest order binary-coded array and division of successive quotients to obtain remainders which are equal to successively higher order numbers of the binary-coded equivalent may be carried out in a like manner. Operation of an arrangement according to the invention is such that binary representations are converted simultaneously and substantially instantaneously to binary-coded equivalent representations without utilizing diverse and complex electronic and electromechanical equipment. Cyclic steps, sequencing, shifting or storage are not required. All orders of a binary number may be simultaneously converted to parallel representations in a binay-coded numbering system. Each logic array may be comprised entirely of identical sublogic elements which may, for example, be electrical circuits which include only gating and inverting circuits and do not include bistable circuits or other circuits of a cyclic nature.

Other objects and advantageous features of the invention will be apparent in a description of a specific embodiment thereof, given by way of example only, to enable one skilled in the art to readily practice the invention, and described hereinafter with reference to the accompanying drawing.

DESCRIPTION OF AN EMBODIMENT

Figures 1, 2:
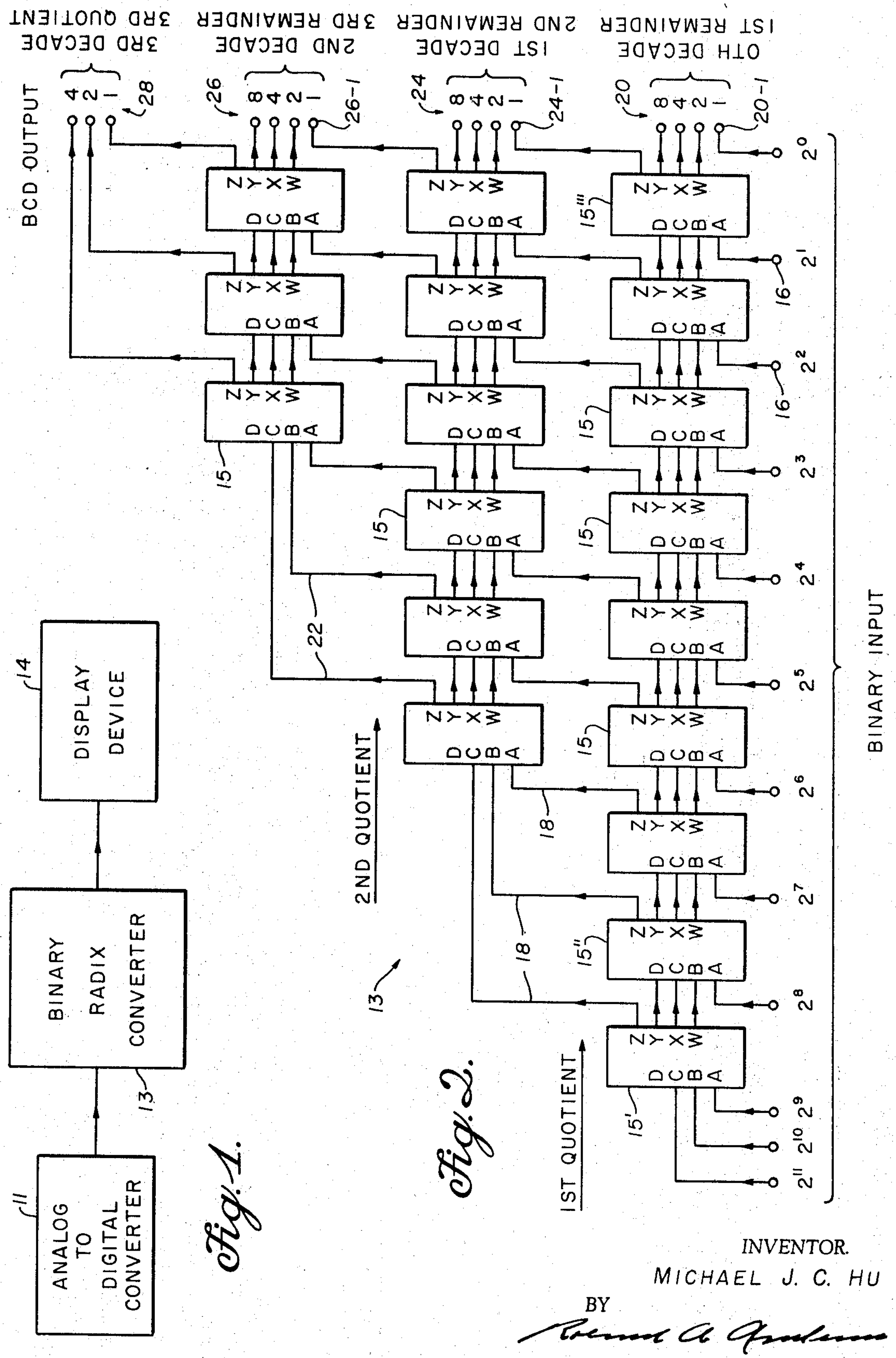
FIG. 1 is a simplified block diagram of a system exemplifying a use of the invention.
FIG. 2 is a block diagram of a binary to binary-coded decimal converter, utilizing a plurality of aarrays of identical sublogic gating circuits according to the invention.

One general system in which the invention may be utilized is shown in a block diagram in FIG. 1, and comprises an analogue-to-digital converter 11, a binary radix converter 13, and a display device 14. The analogue-to-digital converter 11 may, for example, be a shaft encoder used to develop parallel binary representations corresponding to a shaft position. These representations may be applied to converter 13 for simultaneous and substantially instantaneous conversion to parallel groups of coded binary representations suitable for activating the display device 14 for continuous and instant display of a number which corresponds to the shaft position. The analogue-to-digital converter 11 may be one of several well known types of shaft encoders, for example, one utilizing a low voltage applied to a coded pattern on a printed circuit board which is carried on a shaft. The pattern represents the position of the shaft so that binary signals may be derived at the output of sliding contacts engaged with the pattern to determine the posiiton of the shaft. The display device 14 also may be one of several well known devices, for example, one which converts representations by means of logic circuits to corresponding signals that appropriately energize ordinal filament display tubes to indicate the shaft position.

The system shown in FIG. 1 would be especially useful, for example, for remote centralized control of equipment used in conjunction with a long, linear, particle accelerator. Such equipment would include a number of slits for defining the energy of the beam emerging from the accelerator, and would further include a number of collimators for collimating the beam. The gap widths of the slits and collimators may be accurately, continuously, and instantaneously indicated by the system shown in FIG. 1 to enable precise gap width control for effective utilization of the beam.

The converter 13 (FIG. 1) is shown in block diagram form in FIG. 2, and is comprised of a plurality of sublogic elements 15 which may be electrical circuits, more fully described hereinafter, and which may be arranged to convert representations of numbers in the straight binary code to binary-coded decimal (BCD) form. The converter 13 (FIG. 2) is provided with odrdinally arranged binary input terminals 16 and zeroth to third BCD decade output terminals 20, 24, 26 and 28. Parallel binary signals ordinally applied to the input terminals 16 causes numerically equivalent parallel BCD signals to appear simultaneously and substantially instantaneously at output terminals 20, 24, 26 and 28, each of which comprises four terminals weighted 8, 4, 2, 1 and designated accordingly.

The input terminals 16 are connected to a decade array of sublogic circuits 15 (shown in FIG. 3) which correspond to the zeroth BCD decade. The sublogic circuits of this array function in response to binary signals applied thereto to divide the corresponding binary number by binary 101 to produce first quotient representations on first quotient output leads 18 and first remainder representations on the zeroth decade BCD output terminals 20.

The first quotient representations are applied to the inputs of a second array of sublogic circuits 15 which corresponds to the first BCD decade. The sublogic circuits of this array are oberable in response to the first quotient representations applied thereto to divide the first quotient by 101 to produce second quotient representations on second quotient output leads 22 and second remainder representations on the first decade BCD output terminals 24. The second quotient representations are applied to the inputs of an array of sublogic circuits 15 which correspond to the second BCD decade. These circuits function in response to the second quotient representations to divide the second quotient by 101 and produce third remainder representations on the second decade BCD output terminals 26 and third quotient representations on the third decade BCD output terminals 28.

It should be noted that the lowest order (2°) binary input terminals 16 is connected directly to a zeroth decade terminal 20–1, while the lowest order first quotient output lead 18 and lowest order second quotient output lead 22 are connected directly to the first decade terminal 24-1 and second decade terminal 26–1 respectively. These connections permit a binary to 8, 4, 2, 1 BCD conversion according to the modulus 1010 method to be carried out by actual division with binary 101.

Thus, according to the modulo 1010 method of conversion, the binary input representations applied to the input leads 16 are converted to parallel binary coded decimal representations from the lowest to highest order on outputs 20, 24, 26 and 28, respectively.

The converter 13 is comprised solely of the identical sublogic circuits 15, each of which has a dividend input having terminals A, B, C and D, a remainder output having terminals W, X, Y, and a quotient output having a terminal Z. Input terminal A and output terminal W are the lowest ordinal input terminal and output terminal, respectively. Each circuit 15 divides 101 into the binary number represented at the input terminals A, B, C, D. If the binary number is greater than 101, a binary 1 signal will appear at the quotient output terminal Z, and the remainder or difference will be represented at output terminals W, X and Y according to normal long division rules. Should the binary number be less than 101, then a zero signal will appear at the quotient output terminal Z and the binary number applied to the inputs will be transferred directly to the output terminals W, X and Y which are connected directly to the input terminals B, C and D of the next lower ordinal sublogic circuit 15. For example, the zeroth decade shown in FIG. 2 is comprised of nine sublogic circuits 15 to which the input terminals 16 are connected. The three highest ordinal binary digit representations are applied to the terminals A, B and C of a sublogic circuit 15'. If the binary signals applied thereto are greater than or equal to 101, signals representing the difference therebetween will be developed at output terminals W, X and Y, and a 1 signal will be developed at the quotient output terminal Z. If the signals applied to terminals A, B and C represent a value less than 101, then the signals will be transferred directly to the terminals W, X and Y, and a zero signal will be developed at the quotient output terminals Z. The next lower ordinal sublogic circuit 15'' is connected with its input terminals B, C and D to the output terminals W, X and Y, respectively, of circuit 15'. With the inputs and outputs so connected, the next lower ordinal binary dividend digit signal is applied to the input terminal A of circuit 15''. Division of 101 into the value represented by the signals applied to terminals A, B, C, D of circuit 15'' is carried out as described with reference to circuit 15' and the appropriate signals generated at terminals W, X, Y and Z of circuit 15''. With the circuits 15 connected as described to form the zeroth decade, successive minuends are developed at the output of each circuit in conjunction with the next lower ordinal binary representation. The output representations from the lowest ordinal sublogic circuit 15''' of the zeroth decade will represent, when combined with the lowest ordinal binary input digit, the remainder of a division of the binary value represented at the input terminals 16 by 1010. By a similar process, the first quotient representations appearing on the leads 18 are applied to the first decade sublogic circuits 15 to develop second remainder representations on the output terminals 24. Appropriate representations are similarly obtained on the output terminals 26 and 28. In accordance with the above and utilizing the structure such as represented in FIG. 2, a 12-bit binary number may be converted to an equivalent 4-place BCD number.

In order to carry out a conversion in the manner described, each sublogic circuit 15 is arranged for operation according to the following rules:

(1) If the signal at the input terminal D represents a 1, then the signal at the output terminal Z represents a 1, and 101 is subtracted from the input value and the difference signals are applied to output terminals W, X, Y.

(2) If the signal at input D represents a 0 and the signals at the input terminals A, B, C represent a value equal to or greater than 101, then the signal developed at the quotient output terminal Z represents a 1, and 101 is subtracted from the input value and the difference signals are applied to the output terminals W, X, Y.

(3) If the signal at input terminal D represents a 0 and the signals at the input terminals A, B, C represent a value less than 101, then the signal developed at the quotient output Z represents a 0 and the signals at input terminals A, B, C are transferred directly to the output terminals W, X, Y.

All of the possible combinations of conditions which may occur during operation of a sublogic circuit 15 according to the above rules may be listed in a truth table such as Table I.

TABLE I

| Inputs | | | | Outputs | | | |
|---|---|---|---|---|---|---|---|
| D | C | B | A | Y | X | W | Z |
| 0 | 0 | 0 | 0 | 0 | 0 | 0 | 0 |
| 0 | 0 | 0 | 1 | 0 | 0 | 1 | 0 |
| 0 | 0 | 1 | 0 | 0 | 1 | 0 | 0 |
| 0 | 0 | 1 | 1 | 0 | 1 | 1 | 0 |
| 0 | 1 | 0 | 0 | 1 | 0 | 0 | 0 |
| 0 | 1 | 0 | 1 | 0 | 0 | 0 | 1 |
| 0 | 1 | 1 | 0 | 0 | 0 | 1 | 1 |
| 0 | 1 | 1 | 1 | 0 | 1 | 0 | 1 |
| 1 | 0 | 0 | 0 | 0 | 1 | 1 | 1 |
| 1 | 0 | 0 | 1 | 1 | 0 | 0 | 1 |
| 1 | 0 | 1 | 0 | 1 | 0 | 1 | 1 |
| 1 | 0 | 1 | 1 | 1 | 1 | 0 | 1 |
| 1 | 1 | 0 | 0 | 1 | 1 | 1 | 1 |
| 1 | 1 | 0 | 1 | 0 | 0 | 0 | 1 |
| 1 | 1 | 1 | 0 | 0 | 0 | 1 | 1 |
| 1 | 1 | 1 | 1 | 0 | 1 | 0 | 1 |

Using the combinations represented in Table I, logical equations for the outputs W, X, Y and Z may be derived and simplified in terms of the inputs A, B, C and D, using conventional Boolean notation, and may be written as follows:

Output $Y=\overline{D}C\overline{B}\overline{A}+D\overline{C}\overline{B}A+D\overline{C}B\overline{A}+D\overline{C}BA+DC\overline{B}\overline{A}$ and by Veitch Diagram simplification method, as explained in Logical Design of Digital Computers, by Montgomery Phister, Jr., John Wiley and Sons, Inc., 1959, pgs. 81–94,

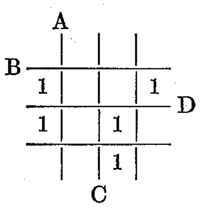

simplified output $Y=D\overline{C}B+D\overline{C}A+C\overline{B}\overline{A}$.

Output $X=\overline{D}\overline{C}B\overline{A}+\overline{D}\overline{C}BA+\overline{D}CBA+D\overline{C}\overline{B}\overline{A}+D\overline{C}BA+DC\overline{B}\overline{A}+DCBA$

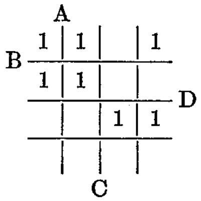

and simplified output $X=BA+D\overline{B}\overline{A}+\overline{D}\overline{C}B$.

Output $W=\overline{D}\overline{C}\overline{B}A+\overline{D}\overline{C}BA+\overline{D}CB\overline{A}+D\overline{C}\overline{B}\overline{A}+D\overline{C}B\overline{A}+DC\overline{B}\overline{A}+DCB\overline{A}$

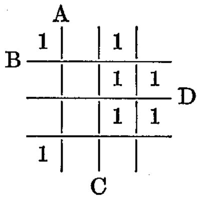

and simplified output $W=CB\overline{A}+D\overline{A}+\overline{D}\overline{C}A$.

Output $Z=\overline{D}C\overline{B}A+\overline{D}CB\overline{A}+\overline{D}CBA+D\overline{C}\overline{B}\overline{A}+D\overline{C}\overline{B}A+D\overline{C}B\overline{A}+D\overline{C}BA+DC\overline{B}\overline{A}+DC\overline{B}A+DCB\overline{A}+DCBA$

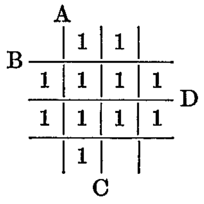

and simplified output $Z=CA+CB+D$.

Figure 3:
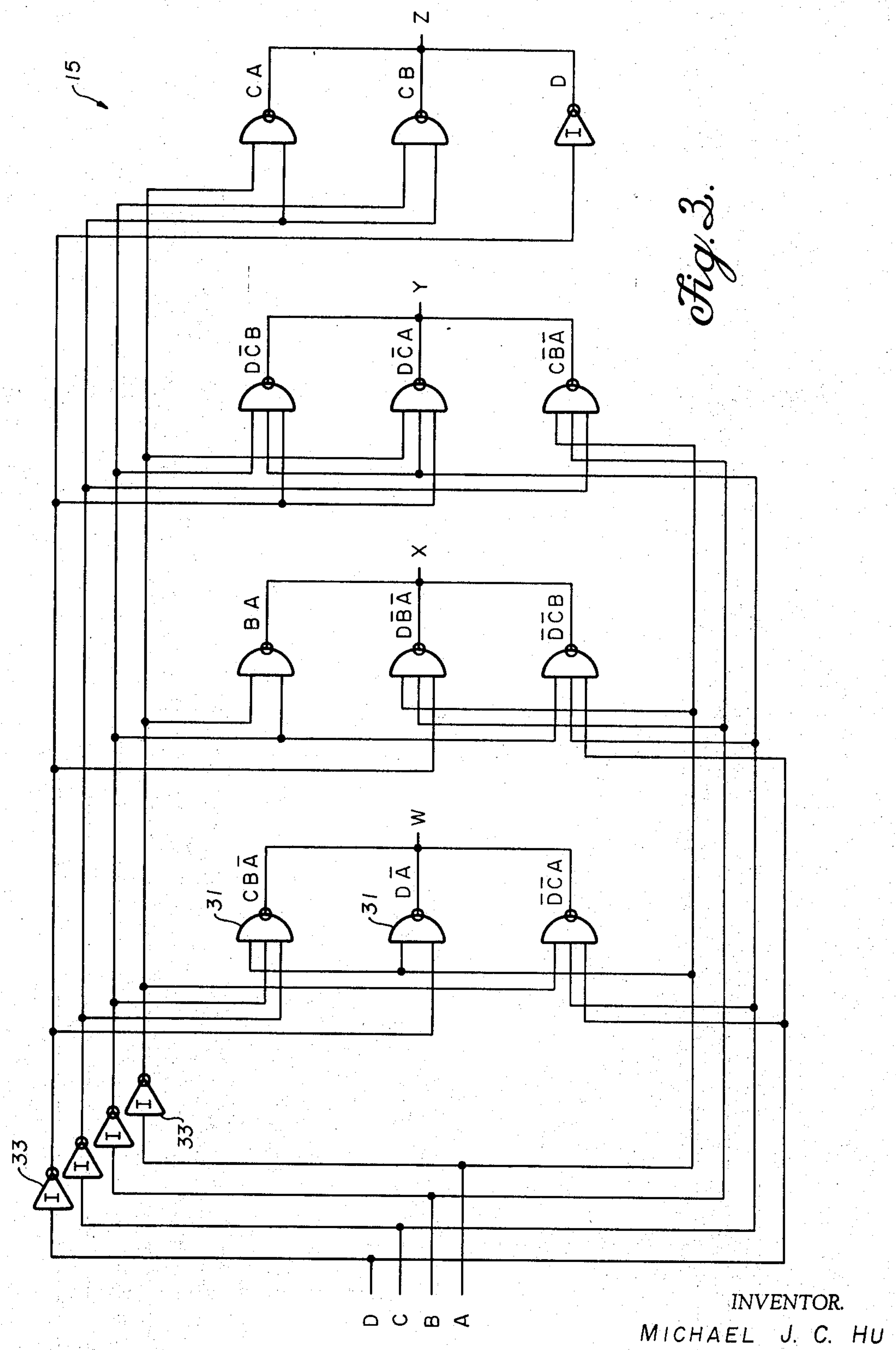
FIG. 3 is a logic diagram of any one of the sublogic gating circuits shown in block form in FIG. 2.

A sublogic circuit 15 may be arranged to operate in accordance with the simplified logical equations to obtain the combinations listed in Table I. One such logic circuit 15 is shown in FIG. 3. This sublogic circuit is comprised of two and three input terminal NAND gates 31 and inverting amplifiers 33. A NAND gate is a gate which responds to a coincidence of input signals of the same polarity to develop an output signal of the opposite polarity. The NAND gates 31 are arranged in four groups, each group having a respective output W, X, Y, and Z, each of which outputs represents a corresponding function W, X, Y, and Z in the preceding equations. Each gate corresponds to a term in the simplified equation for its group. This term is shown at the output of each gate and indicates that a binary "1" output signal is produced by the gate whenever input conditions to the circuit 15 are those defined by the term; otherwise a binary "0" is produced. Since the gates 31 are NAND gates, a binary "1" output signal is produced only in response to a coincidence of binary "0" signals at the input to a gate; it is necessary, therefore, to invert all "1" signals applied to the input of circuit 15 by means of the inverting amplifiers 33 so that all "1" signals will be effective to activate the appropriate gate inputs, while the "0" signals may be applied directly to the gates. For example, to obtain a "1" output signal at the output terminal W for input signals $D\overline{A}$, a "0" signal is applied directly from the A input terminal of circuit 15 to the input of the $D\overline{A}$ gate, while a "1" signal at the D input terminal of circuit 15 is inverted to a "0" signal before application to the input of the $D\overline{A}$ gate. This results in a coincidence of "0" signals at the input of the $D\overline{A}$ gate with a consequent generation of a "1" output signal at the terminal W. When the input conditions indicated at the output of each gate 31 are not present, the output of the gate is a "0" signal.

One embodiment exemplifying the invention included a converter that was constructed for conversion of representations of binary numbers having twelve orders to binary-coded decimal represtntations of decimal numbers having four orders. Identical sublogic circuits were used that comprised inverters and NAND gates constructed only of diodes, resistors and transistors. The total time required for a conversion is a function of the upper frequency at which the transistor can operate. The transistors used operate at approximately 2 megacycles, giving a total propagation time for a conversion of approximately 4.5$\mu$'s for conversion of a 12-bit binary number to a BCD number. All major slits and collimators in the beam switchyard of a long linear accelerator were each arranged to have their position represented by the angular position of a respective shaft. An analogue-to-digital encoding disk was mounted on each shaft and was coupled to the converter through selective switches. Each disk comprised 1024 detectable angular positions, each disk position being encodable to a representation of a 12-bit binary number. The excursions of the gaps of the slits and collimators ranged from 0–¾" to 0–3", giving detectable increments from .00073" to .00293".

Conversion of binary representations to binary-coded representations of numbering systems other than the binary coded decimal system is contemplated as within the scope of the invention. For example, one particularly useful conversion would be from binary representations to binary-coded octal representations. It is further contemplated that sublogic elements other than electrical circuits may be used such as well known fluid logic elements.

While an embodiment of the invention has been shown and described, further embodiments or combinations of those described herein will be apparent to those skilled in the art without departing from the spirit of the invention.

I claim:

1. In a conversion system for converting first parallel binary representations of a first number in a first numbering system having a base of 2 to second parallel binary representations second numbering system which is binary coded decimal, said second number being equivalent to said first number, the combination of:

(a) a source of said first representations;

(b) a first logic means coupled to said source and responsive to said first representations therefrom for producing parallel representations of a first quotient in said first numbering system and parallel representations of a first remainder in said second numbering system, said first quotient representations and said first remainder representations representing a first quotient and a first remainder of a division of said first number by the base of said second number expressed in said first numbering system, said first remainder representations representing the digit in the lowest ordinal position of said second number; and (c) a second logic means connected to said first logic means and responsive to said first quotient representations therefrom for producing parallel representations of a second quotient in said first numbering system and parallel representations of a second remainder in said second numbering system, said second quotient representations and said second remainder representations representing a quotient and remainder of a division of said first quotient by the base of said second numbering system expressed in said first numbering system, said second remainder representations representing the next higher ordinal digit of said second number, wherein said first and second logic means are each comprised solely of a plurality of logically identical sublogic elements connected in cascade, said first logic means is comprised of $n-3$ of said sublogic elements and said second logic means is comprised of $n-6$ sublogic elements, where $n$ is the number of ordinal positions in said first number, each of said sublogic elements includes a dividend input, a remainder output, and a quotient output, each of said sublogic elements being connected for operation upon application to said dividend input of representations of a binary number at least equal to binary 101 for producing a binary 1 representation at said quotient output, and further producing representations of the difference between said binary number and 101 at said remainder output, and each of said sublogic elements being connected for operation upon application to said dividend input of representations of a binary number less than 101 for producing a binary 0 representation at said quotient output, and for producing at said remainder output the representations less than 101 applied to said dividend input.

2. The combination according to claim 1, wherein said dividend input includes four ordinal input terminals, said remainder output includes three ordinal output terminals, and each of said sublogic elements being connected for operation according to logic equations in the notation of Boolean algebra, where $$W=CB\overline{A}+D\overline{A}+\overline{D}\overline{C}A$$
$$X=BA+D\overline{B}\overline{A}+\overline{D}\overline{C}B$$
$$Y=D\overline{C}B+D\overline{C}A+\overline{C}\overline{B}\overline{A}$$
$$Z=CA+CB+D$$

and where the functions W, X, and Y correspond respectively to a binary 1 representation at the lowest, second and highest ordinal terminals of said remainder output, the function Z corresponds to a binary 1 representation at said quotient output, the variables A, B, C and D correspond respectively to a binary 1 representation at the lowest, second, third and highest ordinal dividend input terminals, and the variables $\overline{A}$, $\overline{B}$, $\overline{C}$, and $\overline{D}$ correspond respectivtly to a binary 0 at the lowest, second, third and highest ordinal dividend input terminals, and wherein each of said sublogic elements further includes a plurality of elements each corresponding to a term in one of said equations and each operable to produce a 1 representation at the output terminals corresponding to the function of the corresponding term upon application to said dividend input terminals of representations that correspond to the variables of the term.

3. The combination according to claim 1 wherein said source is an analogue-to-digital converter, and further including a display device connected to said first and second logic means for displaying a representation of said remainder representations therefrom.

References Cited

UNITED STATES PATENTS

| | | | |
|---|---|---|---|
| 3,449,555 | 6/1969 | Wang | 235—155 |
| 3,172,097 | 3/1965 | Imlay | 340—347 |
| 3,242,323 | 3/1965 | Marasco | 235—155 |
| 3,082,950 | 3/1963 | Hogan | 340—347 |

MAYNARD R. WILBUR, Primary Examiner

J. GLASSMAN, Assistant Examiner

U.S. Cl. X.R.

340—347